US008155987B2

(12) United States Patent  
Jaeck et al.

(10) Patent No.: US 8,155,987 B2
(45) Date of Patent: Apr. 10, 2012

(54) LINKING TRANSACTIONS WITH SEPARATE SYSTEMS

(75) Inventors: Volker Jaeck, Nussloch (DE); Wolfram Schick, Karlsruhe (DE); Rolf Mantel, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1110 days.

(21) Appl. No.: 11/849,139

(22) Filed: Aug. 31, 2007

(65) Prior Publication Data

US 2009/0064148 A1 Mar. 5, 2009

(51) Int. Cl.
G06Q 30/00 (2006.01)
(52) U.S. Cl. .................. 705/7; 705/26; 705/27; 705/37
(58) Field of Classification Search ................ 705/7, 26, 705/37, 27
See application file for complete search history.

(56) References Cited

U.S. PATENT DOCUMENTS

| 7,124,354 | B1* | 10/2006 | Ramani et al. ............... 715/205 |
| 7,318,064 | B2* | 1/2008 | Patterson ............... 1/1 |
| 7,366,772 | B2* | 4/2008 | Arroyo et al. ............... 709/223 |
| 2003/0004813 | A1* | 1/2003 | Arroyo et al. ............... 705/22 |
| 2003/0172007 | A1 | 9/2003 | Helmolt et al. |
| 2007/0074150 | A1 | 3/2007 | Jolfaei et al. |
| 2007/0250600 | A1 | 10/2007 | Freese et al. |
| 2009/0064200 | A1* | 3/2009 | Walter ............... 719/328 |

* cited by examiner

Primary Examiner — Nga B. Nguyen
(74) Attorney, Agent, or Firm — Blakely, Sokoloff, Taylor & Zafman LLP

(57) ABSTRACT

Methods and apparatuses enable linking stateful transactions with multiple separate systems. The first and second stateful transactions are associated with a transaction identifier. Real time data from each of the multiple systems is concurrently presented within a single operation context to provide a transparent user experience. Context data may be passed from one system to another to provide a context in which operations in the separate systems can be linked.

18 Claims, 5 Drawing Sheets

LINKING TRANSACTIONS WITH SEPARATE SYSTEMS

FIELD

Embodiments of the invention relate to network communications with separate systems, and more particularly to linking transactions with separate systems to provide a transparent user experience.

BACKGROUND

In performing a business task or requesting an action on a network, it may be necessary to obtain data or services from multiple separate or independent systems. Connecting to the first system is traditionally handled with a stateful transaction. There are generally two traditional approaches to connecting to the second system, both of which have disadvantages.

Under a first traditional approach, a user device initiates a stateful transaction in the first system to enable the user device to obtain data from the system. With synchronous remote function calls (RFCs), the first system could establish a connection with the second system, and initiate a stateful transaction in the second system to perform an operation in the second system. The transactions in the first and second systems have the same duration as a controlling business transaction associated with the business task or business process. Such an approach is generally performed where a dedicated software application handles synchronization of the front end with the stateful transactions of both the first and second systems. To trigger an additional action in the second system, the first system could call the second system again by synchronous RFC, reentering the context of the first call. When all processing was performed, everything could be either committed or rolled back in the two systems. The fact that two systems were performing operations to complete the process was transparent to a user in such a system. Due to its stateful nature, the second system can have interactions with the user that are routed through the first system, and user input can be directly routed to the second system and reach the original context. Such directly routed user interaction is completely transparent to the first (calling) system.

However, many systems now perform processes with the use of service requests. The services are generally accessed from a web browser and the results of the operations are presented in the browser. With the access of systems via services and the presentation of results in a web browser, the possibility of synchronous RFC for user interaction no longer exists. Thus, a second approach is becoming more common as more systems offer processing via services. The transactions in the second system are stateless, and end after the completion of the call. As used herein, a stateless transaction or service request refers to a transaction that ends after exactly one round of communication, in contrast to a stateful transaction. The stateless transaction may or may not result in a change to data or system state of the system processing the stateless transaction, and may or may not generate a reply to the caller. Thus, state is not persisted, and there is traditionally no mechanism for reentering the same context again for a second call. To commit a transaction, the first system must initiate another stateless transaction including all information necessary to commit the entire transaction. Due to its stateless nature, the second system can have no direct interaction with the user. At best, the second system provides information to the first system, which executes the user interaction and then calls the second system in a new stateless service call. Thus, current systems either require specialized software applications, or they cannot provide the ability to have a transaction with user interaction that spans multiple systems.

SUMMARY

In one embodiment, real time data related to stateless transactions with multiple separate systems is provided to a user interface. Transactions are initiated with each system, and the transactions reference a common transaction identifier. The real time data from the transactions is presented concurrently within a single operation context of the user interface to provide a transparent user experience. Context data can be passed between the systems to provide a common context in which operations are executed for each transaction in the separate systems. Example systems include CRM (customer relationship management) and SCM (supply chain management) systems, such as an available to promise operation executed in the SCM system.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
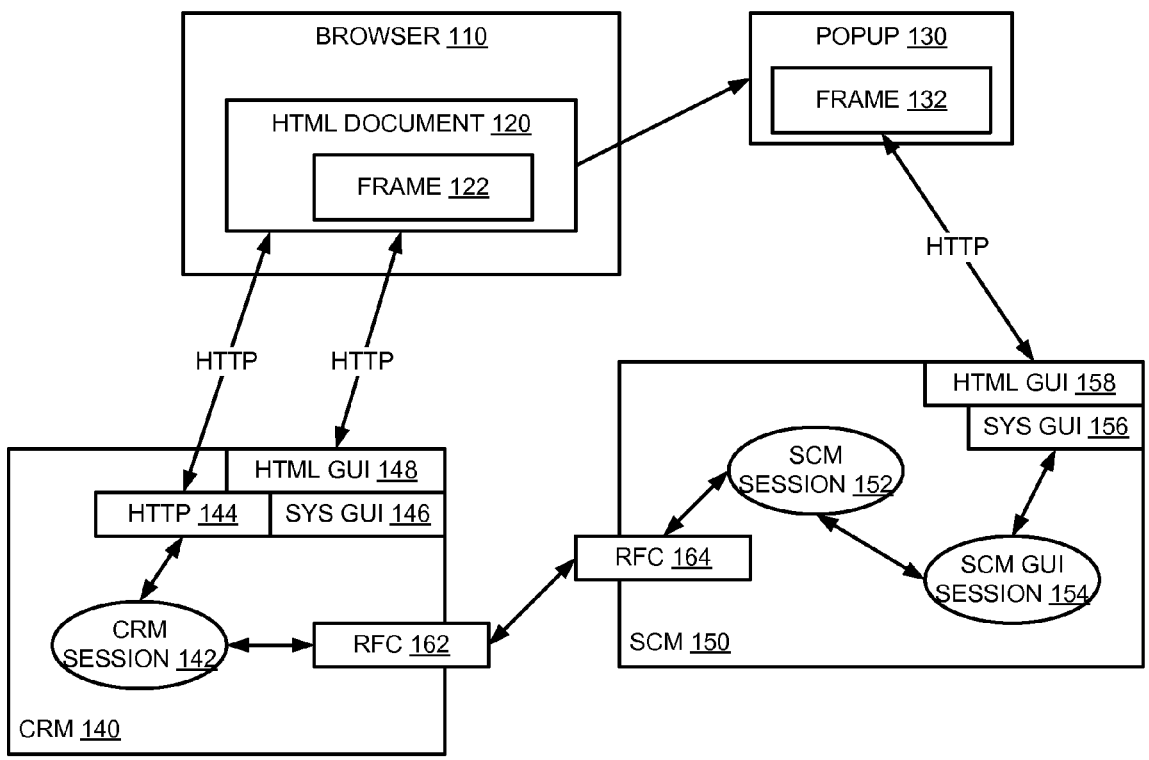
FIG. 1 is a block diagram of an embodiment of a system for initiating and linking transactions in separate systems.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Methods and apparatuses enable transactions with user interaction that span multiple systems. Transactions can be initiated in different systems, and the transactions that span the multiple systems are linked to provide a real time connection to each system, while maintaining transparency to the user. Thus, a single business transaction process can be generated that is actually a number of technical transactions spanning system boundaries that are linked to provide a homogeneous user experience. As used herein, a business transaction refers to a stateful transaction spanning one or several systems, and may be referred to as an interactive business transaction. A business transaction is a set of actions and state changes requested from a front end (via a user). A business transaction generally includes a master stateful transaction that triggers and, if necessary, cancels changes made by stateless service requests. As used herein, a technical transaction refers to a stateful transaction in a system, which may be either a stateful transaction initiated in a system to which a user is connected, as well as a stateful transaction triggered remotely with a remote system to which the user is not directly connected (or a transaction that may be initiated prior to the user connecting to the remote system). A stateful transaction refers to the multiple actions and state changes that must all be either committed or rolled back simultaneously. The user does not necessarily know whether the technical transactions are stateless, or know that the business transaction spans multiple systems. In one embodiment, the business transaction is presented in a browser based environment that provides the same homogeneous user experience as was possible with traditional proprietary GUI (graphical user interface) environments.

The homogeneous user experience on the business transaction can be provided as follows. The first system passes interface data or context data to the second system. As used herein, context data refers to data that indicates a state of the first system, especially as related to a transaction initiated in the first system. In one embodiment, the first system establishes a session with the second system. The session may have a lifespan equal to the lifespan of the controlling business transaction (which is also the lifespan of the first transaction in the first system). The session can thus persist beyond a single communication round trip. Alternatively, the first system can establish communication with the second system that is stateless, and each new need for communication can be met with a new stateless request.

A first stateful transaction may be initiated in the first system, and a remote second stateful transaction can be triggered in the second system via the first system. The second system saves the context data, and references the context data by an identifier (for example, a global unique identifier (GUID)). As used herein, a "first transaction" refers to a stateful transaction initiated in a first system, and a "second transaction" refers to a stateful transaction initiated in a second system. The second transaction may also be a secondary or subordinate transaction to the first transaction (especially given that it has a shorter lifespan). The second transaction may be initiated remotely. The first transaction has a lifespan equal to the lifespan of a controlling business transaction, while the lifespan of the second transaction is shorter in duration than the lifespan of the business transaction. Thus, the first transaction triggers initiation of a second transaction that has a shorter lifespan.

The user interface initiates a stateful transaction in the second system, and passes the GUID as a reference in the request (e.g., in a URL). In one embodiment, a browser-based system is implemented, where the call of the second system is made via a new URL, which passes interface data to the second system. However, the type of data that can be passed in the URL is very limited because it has to be coded into the URL. Thus, the second stateful transaction in the second system reads the context data stored in the second system to perform its processing in the context of the context data. The second system may then generate return interface data to pass back to the user interface to indicate the processing result. In one embodiment, no processing result data is passed by the second system. The second system saves the processing result data with the context data, and references all the data by the GUID. In one embodiment, the second system also stores internal state of the second transaction. The internal state of the second transaction can be stored with the context data and become part of the context data for any subsequent transactions executed in the second system. In one embodiment, the first transaction does not receive data as a result of the transaction. Rather, it may receive only an indication that the second transaction has ended.

The first transaction may retrieve the stored result data from the second system in the background for further processing and/or presentation in a UI for further user interaction. If necessary, a second round of processing in the second system can be triggered. However, the second round of processing in the second system may be executed differently than traditional remote transactions, which cannot join the second transaction to the first transaction when the first transaction has ended. The second round of processing in accordance with the teachings herein would behave as a continuation of the second transaction in the second system via the stored context data. When all rounds of processing associated with the second transaction are completed, the lifespan of the second transaction is over.

The first system can send a signal to the second system via a synchronous RFC call to either commit or roll back the second transaction. Whether committed or rolled back, the request may trigger the second system to discard the context data stored in the second system. That is, the context data exists to link the various transactions in the second system. When the business transaction is complete, the context data is deleted.

As one example, consider a purchase order request (business transaction) generated from a user interface. The user interface initiates a transaction (a first stateful transaction) with a CRM (customer relationship management) system, which in turn calls an SCM (supply chain management) system via RFC to perform an available-to-promise (ATP) operation. As mentioned above, the call can be either stateful via a session, or stateless via service requests. The CRM system passes context data to the SCM system. The context data includes the interface data generated in the user interface and passed to the CRM system as part of the request. The interface data provides context for the operation to be performed in the SCM system. The operation to be performed is also passed as part of the request. Instead of the SCM system immediately carrying out the ATP operation, the SCM system buffers the context data. The buffered data will provide the information necessary to carry out the requested operation at a later point in time. The SCM system generates an ID for the context data that it passes back to the CRM system.

Continuing the example, the CRM system opens a new GUI container within a frame on the user interface. The frame may execute a segment of JavaScript that registers itself on a special "close"-event and calls a dedicated transaction on the SCM-server via an HTTP (HyperText Transfer Protocol) request. The frame passes the ID to the SCM system, which the SCM system uses to access the buffered context data. Based on the context data, the SCM system executes the ATP check. The SCM system may display the results in the frame and enter into any number of user interactions via the frame. The SCM system may display the results in the frame in accordance with its transaction (a second stateful transaction) with the user interface, and stores its results back to the buffer. In one embodiment, the HTTP connection generates the special close event, which enables the frame to trigger the end of the GUI container in the CRM system. Thus, note that the frame and the SCM transaction have substantially the same lifespan.

Continuing the example, the CRM system calls the SCM system via RFC in response to the close of the GUI container. The RFC request is to read the buffered results, which can be identified with the ID generated above. After obtaining the results data, the CRM system can present the results and allow the user to determine what to do with the information (the results of the business transaction requested by the user). If the user saves the sales order, the system will clear the buffer and commit the data to the backend databases. If the user rejects the sales order, the system clears the buffer without committing the data to the backend databases.

FIG. 1 is a block diagram of an embodiment of a system for establishing and linking transactions with separate systems. System 100 represents a networked system, where CRM 140 and SCM 150 are subsystems that are networked together. For example, system 100 could be an enterprise network system, with multiple backend systems such as CRM 140 and SCM 150. An alternative to the system shown is where system 100 represents a wide-area network such as the Internet. In such a system configuration, CRM 140 and SCM 150 may be publicly available CRM and SCM systems, or alternatively, could be replaced in other system configurations by publicly accessible systems.

Browser 110 represents a web browser executing on a user device (not specifically shown). The user device could be, for example, a worker's computer in an enterprise system. The user device could be a computer of a user at a home with which online ordering is performed. Browser 110 includes HTML (HyperText Markup Language) document 120, which represents any form of web page or interactive user interface that allows a user to obtain data from CRM 140 or another system/subsystem. While HTML is specifically illustrated, it will be understood that comparable data display technologies could be used in addition to, or in place of, HTML. Generally, HTML refers to content that can be displayed and interacted with from browser 110. HTML document 120 may include frame 122, which represents a frame in which data associated with a stateless (HTML) transaction may be presented. Note that under the concept of HTML framing, HTML document 120 may represent a main page through which a user may access any of a number of services or perform any of a number of actions. Frame 122 may be a separate HTML document embedded within HTML document 120 and may be hosted by the same server that provides HTML document 120, or hosted by a separate server. Frame 122 may be considered to display session data or transaction data associated with a transaction (first transaction) established with the hosting server.

CRM 140 is represented with several functional components. The components shown are not intended to represent all functional components of CRM system 140. In one embodiment, CRM 140 includes CRM session 142, which is a session representing a stateful transaction (the first transaction) established between browser 110 and CRM 140. Note that as used herein, a session may or may not have a one to one relationship with a transaction. That is, CRM session 142 includes the first transaction, but may also remain after the end of life of the first transaction. Similarly, SCM GUI session 154 (described below) includes the second transaction, but may persist for longer than the second transaction as described below. The session is a connection that may be established, and will await transactions. Alternatively, the session can represent the existence of the transactions in the various systems, and when the sessions can be understood to end when their respective transactions end. The first transaction is initiated via the exchange of HTTP messages between CRM 140 and browser 110. Generally, browser 110 generates an HTTP request that includes a URL indicating a location in CRM system 140 for the data or service requested. A reply HTTP message may include packets of data that are presented (rendered) in the user interface (UI, which is typically a GUI) of the user device.

CRM 140 includes HTTP socket 144, which represents one or more modules or functional components that provide HTTP services to CRM 140. Such HTTP services include the receiving of requests from browser 110, and the generation of data to send to browser 110. HTTP socket 144 processes incoming messages. In one embodiment, a request received from browser 110 includes interface data, or data that represents what is interacted with by a user to perform the transactions. In one embodiment, HTML document 120 represents a portion of a business process (such as sales ordering) that can be performed from browser 110 by a user. The business process can be a controlling business transaction under which the first and second transactions are linked. Thus, a message from browser 110 may include a request to perform one or more operations related to a business process, which may trigger action in various transactions spanning multiple systems.

System (sys) GUI 146 represents a GUI layer or a technical interface that CRM 140 provides for a front end to connect to the system. System GUI 146 enables the front end (e.g., browser 110) to access data or obtain information from within the CRM system. System GUI 146 can enable browser 110 to obtain and process data objects from CRM 140. HTML GUI 148 is a layer on top of system GUI 146, which interfaces data from the system as HTML documents for display in browser 110.

In one embodiment, CRM 140 is communicatively coupled to SCM 150 via RFC 162. RFC 162 represents one or more components that enable CRM 140 to generate remote function calls for operations in SCM 150. Although RFC is illustrated, it will be understood that other inter-system communication mechanisms could be employed. RFC 162 is to be understood broadly as illustrating any type of inter-system communication mechanism.

SCM 150 includes RFC 164 to exchange inter-system communication with CRM 140. In one embodiment, a request sent from browser 110 to CRM 140 triggers CRM 140 to initiate SCM session 152 in SCM system 150. That is, when execution of an operation in CRM 140 is contingent upon information available from, or a service available from SCM 150, CRM 140 will generate a request for the operation to occur in SCM 150. SCM session 152 may be stateful or stateless. As a stateful session, SCM session 152 may be established between SCM 150 and CRM 140 and await RFCs between the systems. In such an implementation, SCM session 152 may have the same lifespan as that of CRM session 142. Alternatively, stateless service requests could be used, in which case SCM session 152 may not exist for longer than one round trip of communication between the systems. In traditional systems, the request generated by CRM 140 would cause SCM 150 to immediately process and execute the requested operation, as would be consistent with stateless transactions. As described herein, in one embodiment, SCM 150 delays execution of the operation. Instead of executing the operation, SCM 150 buffers the data associated with the request to generate a context in which the requested operation and other subsequent operations may be executed. Instead of returning a result of the operation, SCM 150 can buffer the data and return an identifier to CRM 140. Subsequent requests for operations can reference the identifier, which will then cause them to be executed in the context of the buffered data.

SCM session 152 may trigger the initiation of SCM GUI session 154, which provides a mechanism for SCM 150 to interact with a user via other transactions. Alternatively, SCM GUI session 154 can be initiated as a transaction from the front end. If SCM GUI session 154 is implemented as a session as described above, one or more second or secondary transactions could be initiated within SCM GUI session 154, and the session may exist between the front end and the SCM system for longer than the lifespan of any individual second transaction. In another embodiment, SCM GUI session 154 represents the second transaction itself, in which case, it will be initiated for each secondary transaction that may be executed in SCM 150. In such an implementation, the lifespan of SCM GUI 154 and popup 130 may be the same (or substantially the same). Thus, SCM session 152 represents a session as exists between SCM 150 and CRM 140. SCM GUI session 154 (second transaction) represents a session as established between SCM 150 and the user device. In implementations when both SCM session 152 and SCM GUI session 154 are both sessions that persist longer than their respective transactions, a communication link could also be established between the two sessions. Otherwise, a non long-running communication link between the sessions may exist. The two sessions represented in SCM 150 exchange context and result data. SCM GUI session 154 interfaces with system GUI 156, which generates data related to the session. HTML GUI 158 generates HTML document data to provide to the user device.

In one embodiment, the interaction described above between CRM 140 and SCM 150 triggers browser 110 to generate popup 130. That is, SCM 150 may buffer data and pass an identifier (ID) to CRM 140, which then triggers browser 110 to initiate a transaction with SCM 150. In one embodiment, the ID passed is a GUID associated with CRM session 142 and SCM GUI session 154. The ID is passed to popup 130, and then session 154 may be initiated.

Popup 130 is generally understood as an application that is derivative from browser 110. Browser 110 is a software application that includes logic for generating GUI components, such as windows and elements of the windows. On the user screen, popup 130 may be moved around and interacted with separately from browser 110, but is generated and by the underlying application code that generates browser 110. Popup 130 provides a convenient mechanism for rendering a logically separate UI component. In this case, frame 132 represents the HTML document related to the second transaction with SCM 150. The data of the two transactions (between browser 110 and CRM 140 and between browser 110 and SCM 150) could be combined and represented together on the user interface. However, as illustrated, they could be rendered in separate frames 122, 132.

The system as depicted in FIG. 1 can be understood as representing a single point in time. Certain business processes may require multiple different iterations of interaction with one or both of CRM 140 and SCM 150. CRM session 142 triggers SCM session 152 to store the context data, including the request for an operation. In one embodiment, each time a secondary transaction is initiated in SCM GUI session 154, SCM GUI session 154 queries SCM session 152 what operation it should perform. It may query SCM session 152 whether it needs to retrieve state (e.g., from a previous transaction). If state should be retrieved, SCM GUI session 154 retrieves state and completes the operation. The results may be stored and the second transaction of SCM GUI session 154 closed. However, a request for further processing can initiate a "new" second transaction associated with SCM GUI session 154. It will similarly query SCM session 152 as to what operation it should perform and whether to retrieve state (the answer should be yes in this case). After completion of each secondary transaction in SCM 150, the system stores the result and indicates the completion of the processing to CRM session 142, where results can be retrieved and/or new processing requested.

In one embodiment, establishing CRM session 142 has a first transaction that has a lifespan equal to the business transaction under which the session was established. CRM session 142 can establish SCM session 152, which in turn may establish a second transaction (SCM GUI 154) that has a lifespan less than that of the first transaction. The second transaction could be considered to operate as a stateful transaction in that state is saved, as well as operate as a stateless transaction in that its lifespan is very short relative to the business transaction. Traditionally, stateful transactions all had the same lifespan as the business transaction.

The stateless and stateful transactions are linked via the ID that indicates the stored context data in SCM 150. The stateless transactions are linked to the second stateful transaction. The first and second stateful transactions are linked under the context of the interactive business transaction. The buffering allows the two separate subsystems to provide interactive real-time data related to the same interactive business transaction associated with a business process displayed in the user interface. The fact that the data on the UI is the obtained from separate systems is transparent to a user of browser 110. The data for both subsystems is real-time and interactive, which is in contrast to what is possible with traditional systems that use remote stateless transactions.

Figure 2:
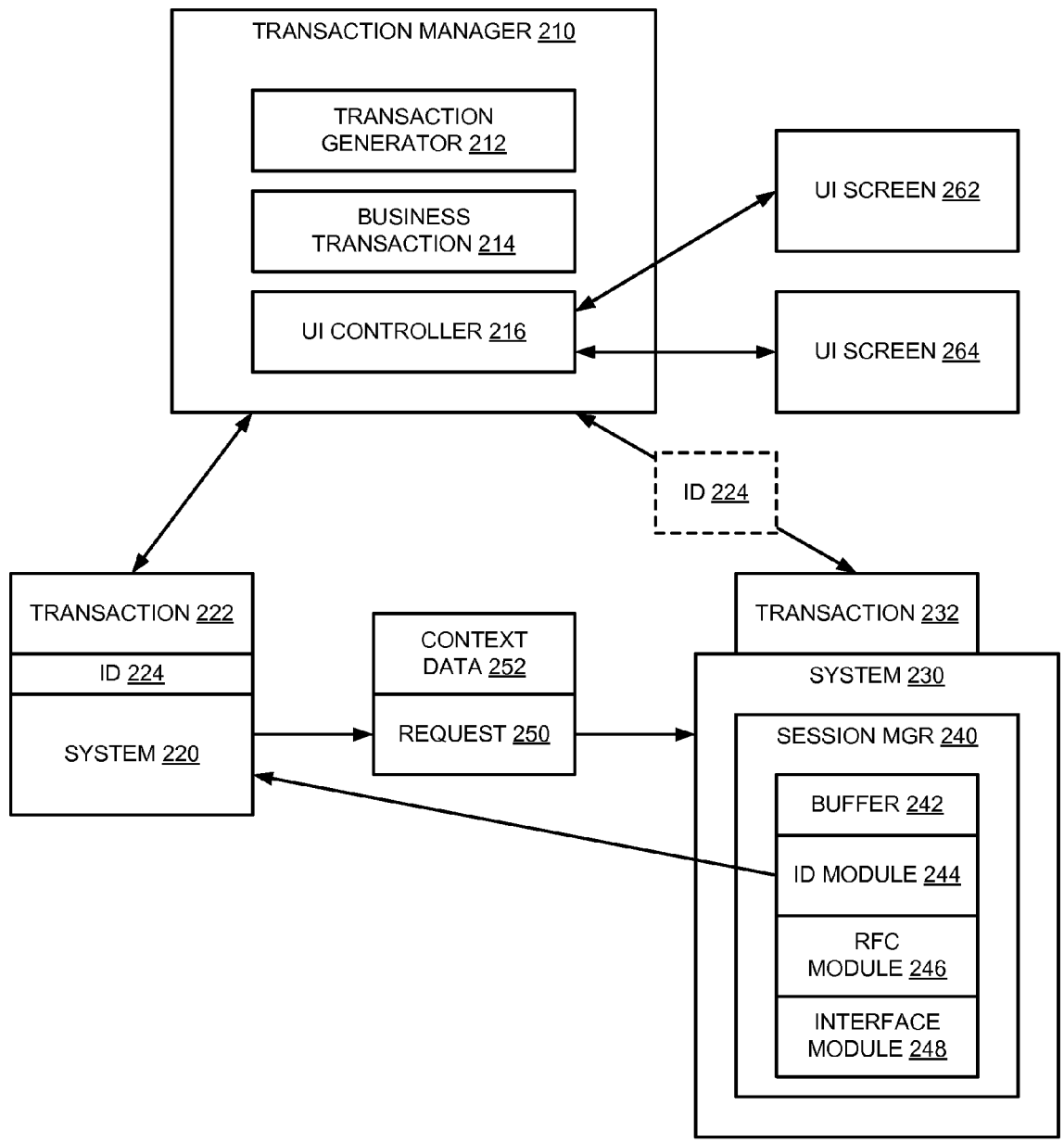
FIG. 2 is a block diagram of an embodiment of a system having a transaction manager that orchestrates concurrent transactions in separate systems under a single business context.

FIG. 2 is a block diagram of an embodiment of a system having a transaction manager that manages concurrent transactions with separate systems in a single operation context. Transaction manager 210 represents one or more components of a user device that generates and manages transactions and session between the user device and other systems. Transaction manager 210 includes transaction generator 212 to create one or more transactions. In one embodiment, the transactions are generated under a framework of a calling sequence. A browser presented in UI screen 262 of the user device receives input (interaction) from a user that triggers transaction manager 210 to output a request to system 220. Transaction 222 represents the first transaction generated, or a stateful transaction initiated in system 220. Transaction manager 210 may also include business transaction 214, which represents the business transaction under which multiple stateful transactions with separate systems are linked. UI controller 216 represents one or more components that enable a user device to display information in a user interface for interactive access by a user.

System 220 calls system 230 via request 250. Request 250 is sent to system 230 in conjunction with context data 252. Although represented as being sent with request 250, context data 252 could be sent as part of a communication exchange between systems 220 and 230. That is, system 220 could initiate an exchange, receive an acknowledgement back from system 230, and transmit context data 252. It will be understood that there are other mechanisms that could accomplish the function of passing context data 252 to system 230. Context data 252 includes all data necessary to perform the requested operation in system 230. In one embodiment, context data 252 describes a state of system 220 in relation to transaction 222. Thus, context data 252 would represent all information necessary to perform an operation in system 230 within the same context as transaction 222.

Under the calling sequence framework, in one embodiment, system 230 delays performance of the operation. Instead, system 230 fills internal buffers (represented by buffer 242), which buffers will then hold all necessary information to carry out operations in the context of the context data. Continuing with the calling sequence description, system 230 passes an identifier to system 220. Transaction manager 210 is then triggered by system 220 to initiate a second transaction, transaction 232, in system 230. The actual initiating of the second transaction may be accomplished via a UI screen, such as a popup that initiates the second transaction. In one embodiment, transaction 222 represents a master stateful transaction and transaction 232 represents a subordinate stateful transaction. The subordinate stateful transaction can be controlled/managed by the master stateful transaction. The lifespan of the subordinate stateful transaction is shorter than the lifespan of the master stateful transaction.

Note that transaction manager 210 need not be a single software or hardware entity. For example, the various functional elements illustrated may be present in certain browsers. The application of those functional elements may be modified based on the requests generated, and the framework of calls under which transaction manager 210 operates.

System 230 includes session manager 240, which represents one or more components included within the system to provide the linking of transactions. Although illustrated in system 230, one or more functional components may exist outside of system 230. Session manager 240 includes buffer 242, which represents one or more buffers, or storage devices in which to store context data 252. In contrast to previous systems, system 230 establishes state by storing context information, and applying the state information to operations executed in response to stateless transaction requests.

In one embodiment, session manager 240 includes ID module 244 that generates an ID to assign to the context data (the state) as buffered within system 230. ID 224 represents the ID created. The ID is passed from system 230 to system 220, and then back to the user device. The ID may or may not be displayed in UI screen 262. In one embodiment, the ID is maintained in a background of the user device, and referenced by the user device in subsequent communications having to do with the same business process.

For example, transaction manager 210 may pass ID 224 to system 230, for example, as part of transaction 232. The ID may trigger system 230 to perform the operations of transaction 232 in the context of the buffered data.

Session manager 240 includes RFC module 246, which represents an RFC interface mechanism between system 220 and system 230. RFC module 246 enables system 230 to interact with system 220. Interface module 248 represents a GUI interface mechanism between system 230 and the user device. Interface module 248 enables system 230 to interact with a user interface, such as receiving interactions, and generating and sending data that is presented on UI screen 264. In response to interactions from the UI, system 230 may make changes to either context data 252, or results data generated within system 230, or both.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 3:
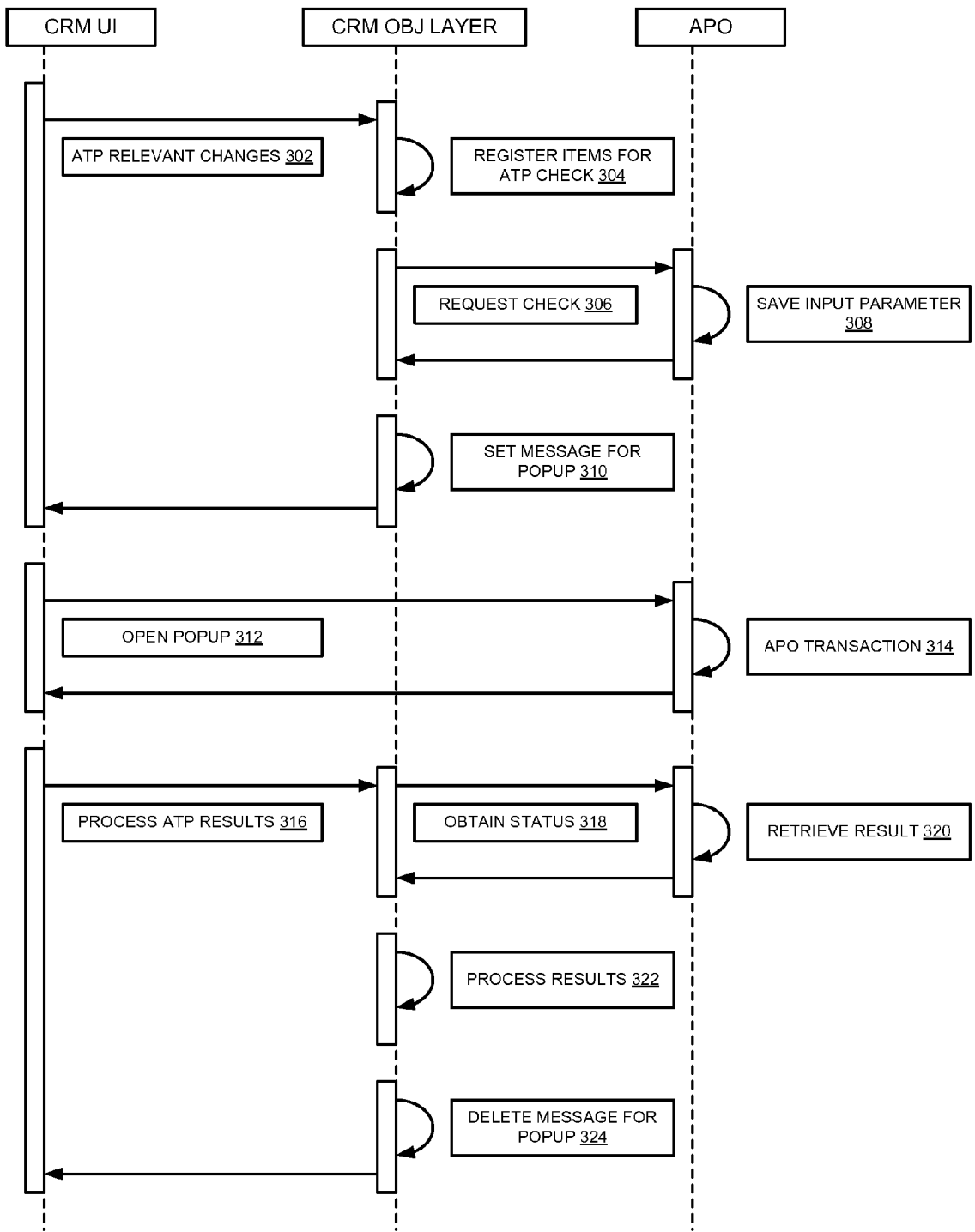
FIG. 3 is a block diagram of an embodiment of a system with functional operations for managing transactions in multiple separate systems.

FIG. 3 is a block diagram of an embodiment of a system with functional operations for managing transactions with multiple separate systems. As illustrated, a CRM system and an APO system (Advanced Planner and Optimizer, as available from SAP AG of Walldorf, Germany) are two systems that have stateful transactions with a user interface. In the example below, the APO system represents an example of a second system, such as where an SCM system is mentioned herein. The APO system can represent an example of an SCM system. The stateful transaction with the APO system is initiated via remote request by the CRM system. The transactions can be linked as described herein. The CRM system includes a CRM UI layer, and a CRM object (obj) layer. The exchange of messages among these different components is described below.

The CRM UI receives a request for ATP relevant changes, 302. ATP relevant changes are changes requested to system data that should be checked against availability of the proposed affected item. Thus, requests for ATP relevant changes will trigger an operation in the APO system. At the CRM object layer, the system registers the items for the ATP check, 304. That is, the system identifies the items in the requested change that require a check. Responsive to the request, the CRM object layer requests a check, 306, from the APO system. The APO system saves the input parameters, 308, of the request, but delays the APO transaction. The request may be long-running (stateful) or stateless. The request is acknowledged, such as by an identifier as described above. The CRM object layer then sets a message for a popup to be opened from the CRM UI layer, 310.

The popup is opened and the message displayed, 312. The opening of the popup may include initiating a transaction between the UI and the APO system. The opening of the popup can include sending the identifier with a URL of the popup that requests the APO transaction service, and passes the identifier as a URL parameter. Passing the identifier can trigger the request to be linked to the saved data, and the APO system executes the APO transaction in the context of that saved data, 314. Thus, several communications can occur between the popup and the APO system. However, the state of the transaction between the popup and the APO system ceases to exist much sooner than the end of the business transaction. In one embodiment, the ATP results of the APO transaction are stored and not returned to the UI. Rather, the completion of the APO transaction is indicated to the CRM UI.

The CRM UI initiates processing of the ATP results, 316. The CRM object layer requests to obtain the status of the ATP results from the APO system, 318. The APO system retrieves the results, 320, and returns the results to the CRM object layer. The request to retrieve the results may be long-running (stateful) or stateless. The CRM object layer processes the results, 322, and displays the results in a UI screen. The CRM object layer may also generate a delete message for the popup window, 324. The delete message is sent to the browser, which then closes the popup window.

Figure 4:
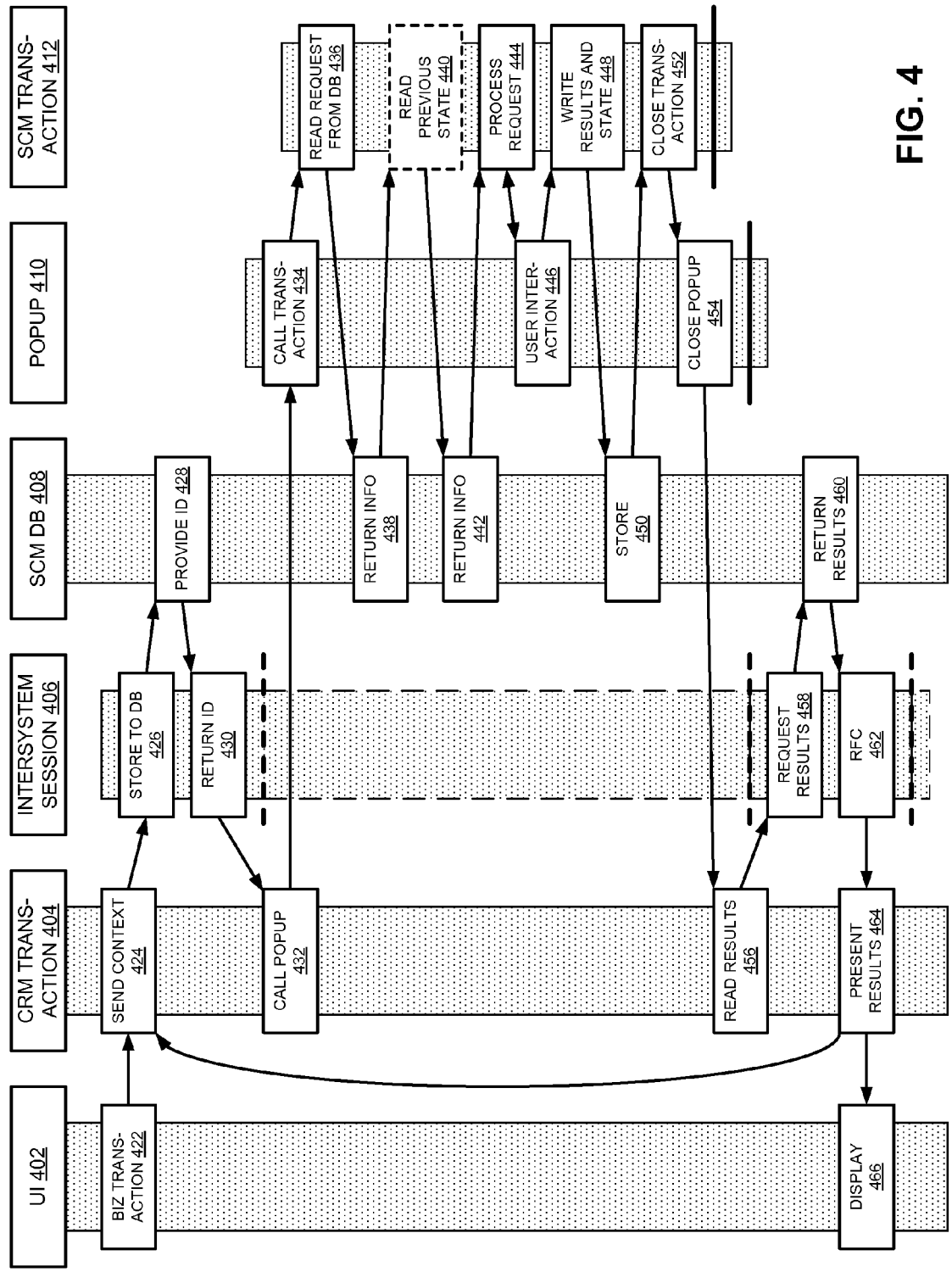
FIG. 4 is a flow diagram of an embodiment of a process illustrating the timing of various transactions and operations in a system that links stateful transactions of separate systems.

FIG. 4 is a flow diagram of an embodiment of a process illustrating the timing of various transactions and operations in a system that links stateful transactions of separate systems. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

As illustrated, various items each have their own "swim lane," in which certain example timing, operations, and interactions are represented. What is illustrated is merely illustrative, and other implementations are possible. UI 402 represents a user interface, which typically includes a browser application, allows a user to interact with various systems. The lifespan of the UI spans the entire process described, as depicted by the shaded area. CRM transaction 404 represents a master transaction as initiated in a first system. The lifespan of CRM transaction 404 also spans the entire process described, and may be the same as the lifespan of UI 402. SCM DB (database) 408 represents a database or storage area of an SCM or second system. The lifespan of SCM DB 408 also spans the entire process described, and may be the same as the lifespan of UI 402.

Intersystem session 406 represents a session or other intersystem communication established between the CRM (first) system and the SCM (second) system. The session provides a mechanism for the CRM system to interact with components of the SCM system. The lifespan of intersystem session 406 is configurable based on system design/implementation. Intersystem session 406 may span entire system (for example it could be established prior to the request to communicate between the two systems). Alternatively, it could operate statelessly, and end after each round trip of communication.

Popup 410 represents a UI component that is derived from a main display, but is not the main display segment of the UI. Popup 410 represents the entity that initiates the second session in the second system. The lifespan of popup 410 is limited to the duration necessary to execute the second transaction. SCM transaction 412 represents a subordinate transaction initiated in the second (remote) system. The lifespan of SCM transaction 412 is limited to the duration necessary to execute the second transaction.

UI 402 may establish a business transaction, 422, such as performing a business or commerce process. CRM transaction 404 is initiated from UI 402, and it sends context data, 424, to the second system via intersystem session 406. Intersystem session 406 stores the context data, 426, in SCM DB 408. In one embodiment, intersystem session 406 generates an ID for the context data, while alternatively the database itself could assign the ID. SCM DB 408 may respond to the request to store the context data by providing the ID, 428, either if it generates the ID, or returns the ID as a confirmation of completion. If the intersystem session already knows the ID, the database need not return the ID to the session. Intersystem session 406 returns the ID, 430, to CRM transaction 404 to indicate the context data was stored, and/or to provide a mechanism of accessing the data in subsequent operations.

CRM transaction 404 then calls, 432, popup 410, and may indicate the ID to the popup. In one embodiment, CRM transaction 404 triggers the popup and passes the ID to the popup for the popup to use in establishing the second transaction. At this point, the lifespan of popup 410 may begin. Popup 410 calls or initiates, 434, SCM transaction 412, SCM transaction 412 reads the request of what operation it is supposed to execute, 436, from SCM DB 408. SCM DB 408 returns the requested context data, 438 to the SCM transaction. The SCM transaction may optionally read previous state information, 440, that may be stored with the context data. If such information is to be retrieved, it is requested of SCM DB 408, and the data returned, 442.

SCM transaction 412 processes the request or performs the requested operation, 444. Processing the request in SCM transaction 412 can trigger an interactive display in popup 410. Thus, one or several rounds of user interaction, 446, may be performed between the SCM transaction and the popup, each round generating processing in the SCM transaction. After all rounds of communication with the popup are complete, the SCM transaction may have data results generated via the processing. The SCM transaction can then write the results and potentially its internal state, 448, to the SCM DB. The SCM DB stores, 450, the results and potentially state information, and confirms the action to the SCM transaction. SCM transaction 412 may then be closed, 452. The solid line below the shaded lifespan block represents the end of the lifespan. Similarly, the popup is closed, 454.

The control returns to the CRM transaction, which can read the results, 456, of the operation in the second system from the database. The reading of the results is performed indirectly via intersystem session 406. CRM transaction 404 generates a request, which is received as a results request, 458, at intersystem session 406. If intersystem session 406 was not persisted, the interaction could be considered to reinitiate the session for the communication related to obtaining the results. The intersystem session requests the results of SCM DB 408, which returns the results, 460, which the intersystem session can provide to the SCM transaction via RFC, 462. SCM transaction 404 may then present the results, 464, to the UI. UI 402 displays, 466, the results. Notice the other arrow indicating that CRM transaction 404 may trigger another round of processing by sending context data along with a request for an operation to the second system, and the process could be repeated. The process can be repeated as many times as necessary to perform the operations desired under the business transaction.

Figure 5:
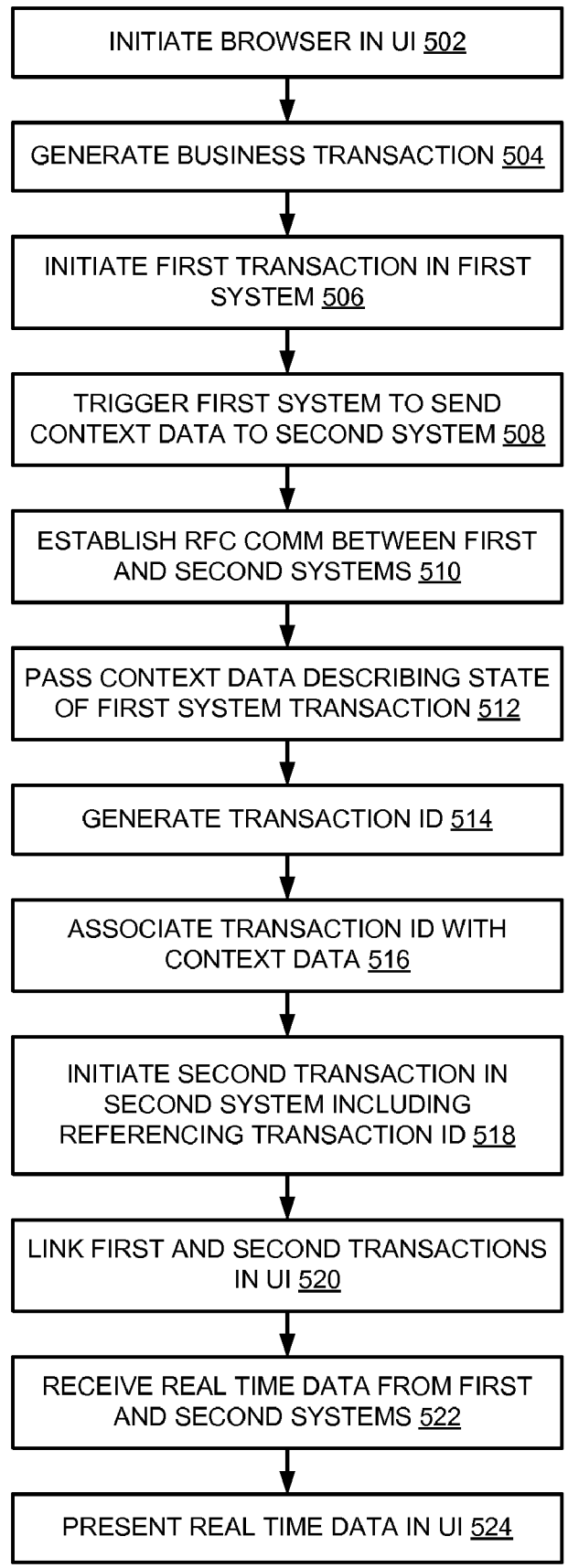
FIG. 5 is a flow diagram of an embodiment of a process for linking transactions to provide a transparent user experience.

FIG. 5 is a flow diagram of an embodiment of a process for linking transactions to provide a transparent user experience. A browser is initiated in a user interface, 502. Whether as a default page, or by request, the browser eventually displays an interactive screen that enables a user to access a first system. Via the browser, a business transaction may be generated, 504. The business transaction may not technically be a transaction in the sense that the systems identify the transaction and operation in relation to the transaction. Rather, the business transaction may be the process executed by a user, for which the various technical transactions provide operations to accomplish the goal of the business transaction. The user via the browser can initiate a first transaction in a first system, 506. In one embodiment, the first system is triggered via the first transaction to send context data to a second system, 508. To send the context data, the first system may generate an RFC with the context data describing a state of the first system associated with the first transaction. Thus, the first system may establish an RFC communication between the first and second systems, 510. The first system then passes the context data describing a state of the first system with respect to the first transaction, 512.

In one embodiment, the second system receives and stores the context data. As part of the storing of the data in the second system, the second system may generate a transaction ID to associate with the context data, 514. The second system can then identify the context data with the transaction ID, 516. The first system and the browser can also reference the transaction ID to indicate that an operation should be associated with the context data. The first transaction is associated with the transaction ID. The associating of the first transaction and the transaction ID can simply refer to the associating of the transaction ID with the context data that is passed to the second system responsive to the first transaction.

The second system may store the context data and not yet perform the operation. Thus, the first system will suspend the first transaction and not provide a result until the operation is performed. Responsive to the sending of the request by the first system to the second system, the browser may initiate a second transaction with the second system, including referencing the transaction ID, 518. The referencing of the transaction ID can operate to link the first transaction with the second transaction in a UI, 520. With such a mechanism, instead of having each transaction exist solely within its own context, the results of the second transaction can be provided as part of the first transaction. Real-time results of both transactions can be combined in a user interface.

The second system performs the operation in response to the second transaction, and in one embodiment stores the results with the context data, referenced by the transaction ID. The second system can indicate the completion of the transaction to the first system, which then requests the data. The results of the operation in the second system may complete the first transaction, or additional processing may be required. If additional processing is required, the additional processing may be performed in the same manner as the interaction of the first and second transactions. In one embodiment, the additional processing is performed under the same first technical transaction in the first system, and a new second transaction in the second system. The browser receives real time data from the first and second systems, 522. In one embodiment, the browser receiving real time data from the second system may refer to the second system passing the results data to the first system, which then presents its own results and the results of the second system in the UI, 524.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   generating, in a computer, a request for service in a first stateful transaction in a customer relationship management (CRM) system, the request triggering the CRM system to provide context information about the first stateful transaction to a supply chain management (SCM) system separate from the CRM system via an intersystem communication;
   receiving a transaction identifier (ID) identifying the context information;
   initiating a second stateful transaction in the SCM system, including referencing the transaction ID to link the first and second stateful transactions, the second stateful transaction having a shorter lifespan than the first stateful transaction; and
   concurrently presenting real time data from the first and second stateful transactions in a user interface.

2. The method of claim 1, wherein generating the request for the first stateful transaction in the first system comprises:
   triggering an available to promise (ATP) operation in the SCM system.

3. The method of claim 1, wherein the request triggering the CRM system to provide context information about the first stateful transaction to the SCM system comprises:
   triggering the CRM system to send context data defining a state of the first stateful transaction.

4. The method of claim 3, wherein triggering the CRM system to send the context data to the SCM system comprises:
   triggering the first system to transmit the context data to the second system via a remote function call (RFC).

5. The method of claim 1, wherein generating the request for service and initiating the second stateful transaction comprise:
   exchanging messages compatible with the HyperText Transfer Protocol (HTTP).

6. The method of claim 1, wherein initiating the second stateful transaction comprises:
   triggering the SCM system to retrieve the context information to provide context for an operation in the SCM system.

7. The method of claim 1, wherein concurrently presenting real time data from the first and second stateful transactions in the user interface comprises:
   presenting the real time data related to the first stateful transaction in a browser window, and presenting the real time data related to the second stateful transaction in a separate frame or popup of the browser.

8. An article of manufacture comprising a machine readable medium having content stored thereon to provide instructions to cause a machine to perform operations including:
   generating a request for service in a first stateful transaction in a first system, the request triggering the first system to provide context information about the first stateful transaction to a second system separate from the first system via an intersystem session;
   receiving a transaction identifier (ID) identifying the context information;
   initiating a second stateful transaction in the second system, including referencing the transaction ID to link the first and second stateful transactions, the second stateful transaction having a shorter lifespan than the first stateful transaction;
   concurrently presenting real time data from the first and second stateful transactions in a user interface; and
   terminating the second transaction and deleting the context data from the second system.

9. The article of manufacture of claim 8, wherein the content to provide instructions for triggering the first system to send the context data to the second system comprises content to provide instructions for
   triggering the first system to transmit the context data to the second system via a remote function call (RFC).

10. A system comprising:
   a processor, a first subsystem to initiate a first stateful transaction in response to a first request from a user interface; and a second subsystem having:
- a remote function call module to receive a remote request from the first subsystem to perform an operation related to the business process in the second subsystem, the remote request including context data describing a state of the first stateful transaction;
- a context manager to buffer the context data, delay performing the operation, and assign a context data identifier (ID) for the context data; and
- an interface module to initiate a second stateful transaction in response to a second request from the user interface identifying the context data ID, the second stateful transaction having a different lifespan than the first stateful transaction;
- wherein the second subsystem performs the operation in the second stateful transaction, and wherein the first subsystem presents a result of the operation in the user interface.

11. The system of claim 10, wherein the first subsystem receives interface data in conjunction with the first request, the first subsystem to further generate the remote request including the interface data as the context data.

12. The system of claim 10, wherein the second subsystem further stores the result of the operation and triggers the first subsystem to read the stored result from the second subsystem via a remote request.

13. The system of claim 10, wherein the second subsystem further stores the result of the operation with the context data.

14. The system of claim 13, wherein the second subsystem further stores its internal state with the result with the context data.

15. The system of claim 13, wherein the second subsystem performs an additional operation in the context of the buffered context data and the stored result in response to receiving an additional request to perform the additional operation.

16. The system of claim 10, wherein the second subsystem receives an indication of a termination of the second transaction, and clears the buffered data responsive to receiving the indication.

17. The system of claim 10, wherein the remote function call module of the second subsystem establishes a session with the first subsystem.

18. The system of claim 17, wherein the second subsystem establishes a connection to pass data between the session and the second stateful transaction.

* * * * *